United States Patent [19]

Welker

[11] Patent Number: 4,830,334

[45] Date of Patent: May 16, 1989

[54] RESILIENT PLUG CONSTRUCTION FOR A FLOW REGULATOR INCORPORATING STRESS LIMITING MEANS

[76] Inventor: Robert H. Welker, Route 1, Box 892, Washington, Tex. 77880

[21] Appl. No.: 251,851

[22] Filed: Oct. 3, 1988

[51] Int. Cl.⁴ ............... F16K 31/122; F16K 7/02
[52] U.S. Cl. ................................ 251/63.5; 138/45; 138/89; 251/191
[58] Field of Search ............ 251/1.2, 5, 57, 61.1, 251/61.2, 62, 63.5, 191; 138/45, 46, 89, 93

[56] References Cited

U.S. PATENT DOCUMENTS

| | | | |
|---|---|---|---|
| 2,917,269 | 12/1959 | Welker | 251/63.5 |
| 3,368,787 | 2/1968 | Sachnik et al. | 251/57 |
| 3,380,470 | 4/1968 | Culpepper, Jr. et al. | 251/57 |
| 3,572,628 | 3/1971 | Jones | 251/5 |
| 3,737,139 | 6/1973 | Watts | 251/5 |
| 3,746,300 | 7/1973 | Welker | 251/63.5 |
| 4,206,902 | 6/1980 | Barthel et al. | 251/57 |
| 4,310,139 | 1/1982 | Williams, III et al. | 251/1.2 |
| 4,460,150 | 7/1984 | Turlak et al. | 251/1.2 |
| 4,460,151 | 7/1984 | Williams, III et al. | 251/1.2 |

FOREIGN PATENT DOCUMENTS

| | | | |
|---|---|---|---|
| 188571 | 3/1956 | Fed. Rep. of Germany | 251/61.1 |
| 1244750 | 9/1960 | France | 251/61.1 |

Primary Examiner—George L. Walton
Attorney, Agent, or Firm—Gunn & Nichols

[57] ABSTRACT

In a flow regulator which is operated by axially compressing the two ends of a resilient cylindrical plug causing the plug to swell and expand outwardly to interrupt flow of natural gas and the like, a stress ring is disclosed. In the preferred embodiment, the stress ring is formed of between eight and 36, preferably being about 24, individual wedge shaped segments having equal angles of inclusion and each segment has a surrounding angled tab segment, the tabs collectively encircling the resilient plug. The tabs form a ring which confines the plug so that radial expansion outwardly and contraction inwardly is accomplished while reducing stress concentration. Moreover, the several segments are all joined to the resilient plug by suitable fastening means such as pins inserted through the segments and into the resilient plug.

13 Claims, 2 Drawing Sheets

RESILIENT PLUG CONSTRUCTION FOR A FLOW REGULATOR INCORPORATING STRESS LIMITING MEANS

BACKGROUND OF THE DISCLOSURE

A flow regulator is a device typically inserted in a natural gas pipeline which has a resilient plug expandable in the annular flow space to thereby control flow through the pipeline. Indeed, the resilient member can be expanded to the extent that all flow is closed off, the annular space being sealed by the expandable plug. Flow regulators of the present inventor are more specifically exemplified in U.S. Pat. Nos. 3,746,300, 4,351,510 and 4,442,999.

The present disclosure is directed to an improved feature above and beyond the structure of the previous flow regulators. By way of background, the flow regulator is constructed with a resilient plug which is compressed, causing swelling radially outwardly into the annular space. This is practically the only component to the apparatus which will ultimately wear out. The relatively high velocity gas flow past the plug causes the radial swelling to bunch or taper so that the back end of the resilient plug swells more than the front end of the plug. This creates stress concentration regions near the back end of the plug thereby resulting in failure at the back region of the plug. The above referenced patents disclose efforts at limiting this swelling as, for instance, by biased plies placed in the plug, or positioning a surrounding lip on the periphery of the plug at both ends.

While the improvements described in the foregoing patents have substantially extended the life of the resilient plug, the present disclosure is directed to yet another improvement which is thought to markedly extend the life of the resilient plug so that its life is substantially indefinite. The present disclosure is directed to a resilient plug which is confined at one end by means of a surrounding stress ring which is in the form of a segmented end cap or cover for the resilient plug having a peripheral lip or shoulder on the cylindrical outer wall of the plug. Moreover, this apparatus is a circular member which is cut with a plurality of radial lines to define multiple identical components which open up somewhat in the fashion of the petals of a flower. It has been determined that there is an optimum number of segments. While the number could increase substantially without limit, the optimum range is typically 36 segments or less, the preferred number of segments being 24 segments. Fewer segments will suffice, also, but as the number of segments is decreased, the gaps between adjacent segments tends to become larger. Accordingly, the range for the number of segments is about 8 to 36 segments with the optimum being 24 segments. The segments collectively define a solid member. The assembled segments is located so that it is able to expand as the plug is expanded outwardly which requires the segments to slide smoothly. They are normally confronted with a facing solid member which assists in squeezing the resilient plug, and to this end, the surface in contact with the end cap is preferably coated with a lubricated surface coating. That assists in sliding movement as the segments slide outwardly and are retracted inwardly on relaxation.

While the foregoing describes in general terms certain features of the present apparatus, the precise nature of the present invention is set forth in detail in the preferred embodiment described below.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings:

FIG. 1 is a lengthwise sectional view through a flow regulator in accordance with the teachings of the present disclosure and incorporating a resilient plug which is constrained by a surrounding stress ring;

FIG. 2 is a sectional view along the line 2—2 of FIG. 1 showing details of construction of the articulated stress ring formed of duplicate multiple segments;

FIG. 3 is a sectional view of the resilient plug contrasted with that shown in FIG. 1 showing radial outward expansion thereof into a sealing relationship in the peripheral flow space; and FIG. 4 shows a modified attachment for the articulated stress ring.

DETAILED DESCRIPTION OF THE PREFERRED EMBODIMENT

Figure 1:
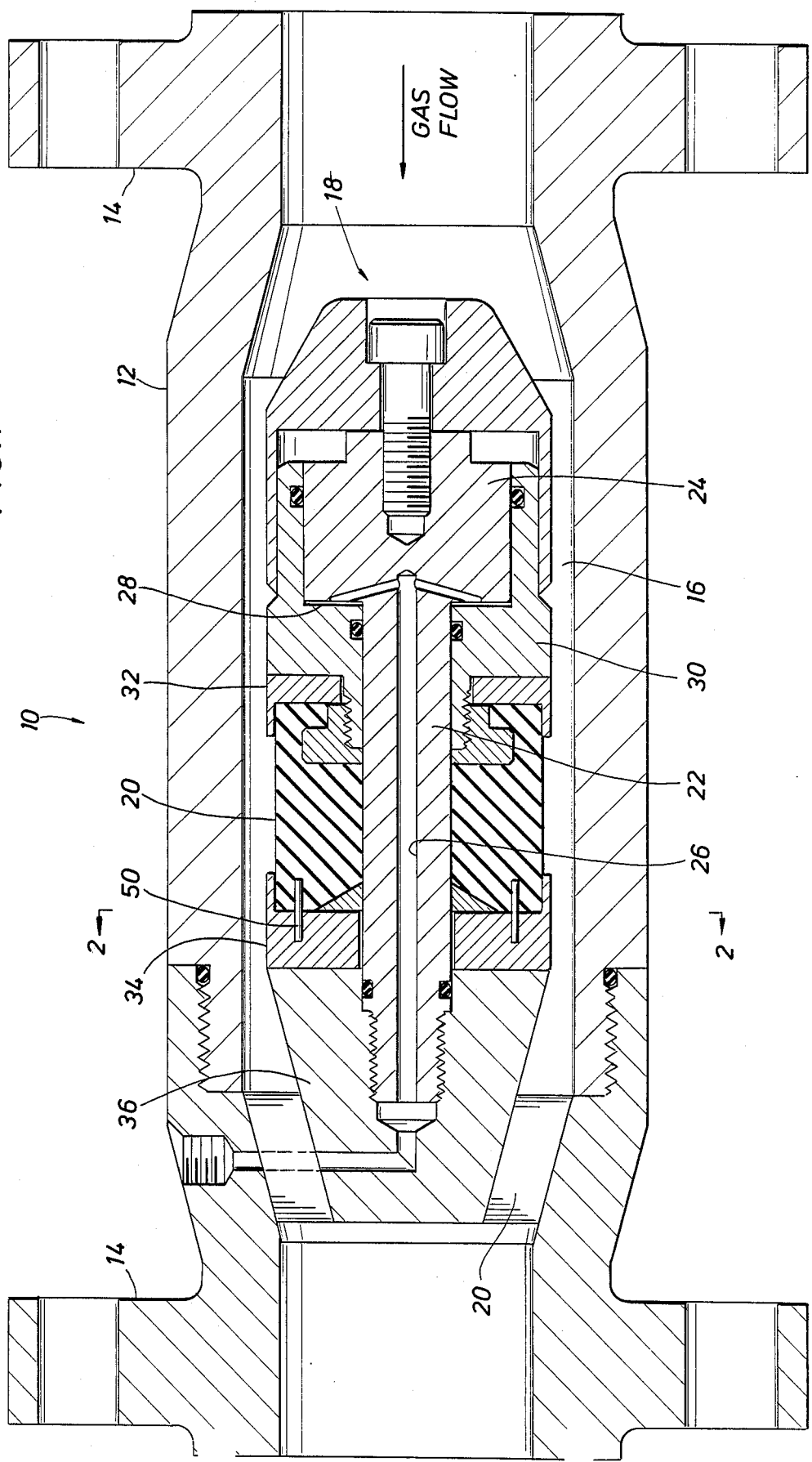

Attention is directed first to FIG. 1 of the drawings which shows a flow regulator 10 constructed in accordance with the present disclosure. The flow regulator is adapted to be installed in a natural gas flow line and to this end, it is constructed in an elongate hollow body 12 terminating in duplicate flanges 14 which permit connection into the pipeline. There is an annular flow space at 16 which permits the natural gas to flow around the regulator body 18. The regulator body is a streamlined centerline enlargement which is supported on radially extending ribs 20, the ribs supporting the body centered in the annular space 16. The gas flow is directed in surrounding laminar flow to the annular space 16. It flows around the streamlined flow regulator 18 and converges downstream after regulation.

The flow regulator incorporates a resilient plug 20 which is an elongate cylindrical hollow member. It is supported on a central mandrel 22 which is anchored at the left hand end. It supports an enlargement 24, and hydrauluc fluid delivered under pressure through a line 26 is introduced into a chamber 28 to expand the chamber. The chamber 28 moves a skirted piston 30 to the left of FIG. 1. The piston 30 bears against the stress ring 32, thereby expanding the resilient plug 20 outwardly. Rubber, for all practical purposes, is considered incompressible. The resilient plug is captured between the forward stress ring 32 and the rear stress ring 34. The rear stress ring abuts the faired end piece 36 which connects with the vanes 20 which hold the flow regulator body 18 in the centerline position.

Operation of the device at this juncture should be considered. Briefly, the mandrel 22 is held stationary. Hydraulic oil under pressure is introduced through the line 26 into the chamber 28 and forces the piston 30 to the left of FIG. 1. The resilient plug 20 is captured and is centered on the mandrel 22 where it is pressured by the piston 30 against the faired end piece 36 fixed in location. Movement of the piston 30 causes the resilient plug to expand radially outwardly. In the absence of gas flow, swelling is centered between the left and right ends. Swelling is constrained by the confining lips of the stress rings 32 and 34. Absent the two lips, the swelling will still be centered, but will have a different shape and will thereby cause the plug to expand in a different fashion. The two stress rings are therefore included to constrain and control the shape of the plug during swelling. This relieves localized stress regions which would otherwise cause the plug to fatigue and wear, the wear typically being localized near the ends of the plug in the absence of the stress rings. Incorporation of the two stress rings thus provides some measure of protection to the plug 20.

While the foregoing assumes that there is no flow, the ordinary circumstances of the present flow regulator involve use in a flowing gas line. The flow velocity is normally quite high, approaching or equal to sonic velocity. This flow causes the enlarged or expanded portion of the plug to localize downstream or near the rear of the stress ring 34. This ring localizes the swelling in the region just described and yet prevents stress concentrations. The benefits, however, of the present apparatus, however, will become more readily apparent upon a consideration of FIGS. 2 and 3 for a description of the articulated stress ring.

Figure 2:
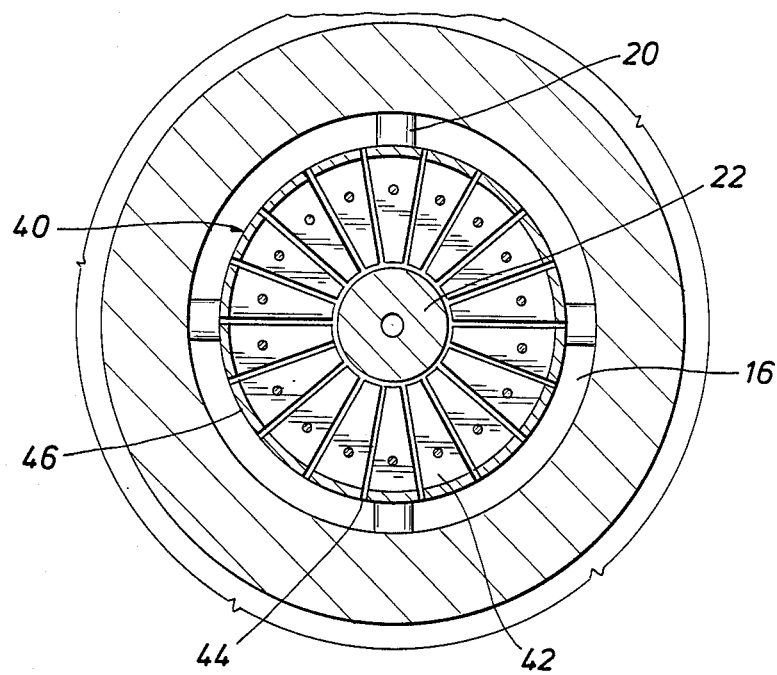

FIG. 2 shows a set of individual stress ring segments each being identical to the other and identified by the numeral 40. Each stress ring segment has an end face 42, the end faces together forming a circle, and the end faces being positioned immediately adjacent to one another to define a substantially narrow slot 44 therebetween. In the relaxed position of the segments which is achieved in FIG. 1, the slot 44 is substantially nil, the adjacent tapered segments abutting one another. The several abutting wedge shaped segments define a circle adjacent to the mandrel 22. They extend radially outwardly, having an outer tab 46 which has sufficient length to lap over the sidewall of the resilient plug 20 as shown in FIG. 1. The segment is therefore relatively thick as illustrated in FIG. 1.

The number of segments shown in FIG. 2 should be considered. The precise number can vary within a range. The range can be as high as can be reasonably assembled, realizing that an increase in multiple small parts simply makes parts handling and installation much more difficult. It is tedious in this sense to have excessive small parts where there is no related gain over the optimum number. Accordingly, the number of parts can range as high as perhaps 36 or so. While this number is acceptable, there is no benefit in exceeding the optimum. The optimum number appears to be 24 which means that each one is cut to an included angle of 15°. This provides the wedge shaped components immediately adjacent to one another so that they are in close abutting relationship as shown in FIG. 2 of the drawings. In this close position, the gap between adjacent wedge shaped segments is nil. It is desirable that they simply be abutted against one another. An acceptable lower number is perhaps eight units. Segmentation into eight permits the units to separate as expansion of the resilient plug occurs, it being kept in mind that expansion radially outwardly separates adjacent wedge shaped members whereby the resilient material may extrude slightly between adjacent segments. For this reason, the optimum is preferable and is ideally 24 units. However, any number of preferably identical segments can be used.

Going to FIG. 1 again, it will be observed that a pin 50 fastens each of the separate wedge shaped members to the resilient plug 20. The pin is located near the outer periphery of the resilient material. The pin is relatively small, and need not penetrate deeply into the resilient plug 20. It is incorporated for the express purpose of securing each individual wedge shaped member so that it is retracted when the resilient plug shrinks. Expansion and shrinkage as the plug is compressed requires the wedge shaped members to move outwardly and then inwardly. When they move in that sequence, they move to the position shown in FIG. 3 of the drawings. Axial force is applied to obtain the position shown in FIG. 3. At this juncture, there would otherwise be a tendency of the wedge shaped members to maintain the expanded position upon relaxation of the resilient plug. Rather than permit this, the wedges are thus pinned to the plug and move radially inwardly. So to speak, the multitude of segments in FIG. 2 expands radially outwardly, enlarging the gaps between adjacent wedges and then collectively return to the very close snug position. They return to the contacted position which was originally obtained at the time of installation.

Figure 3:
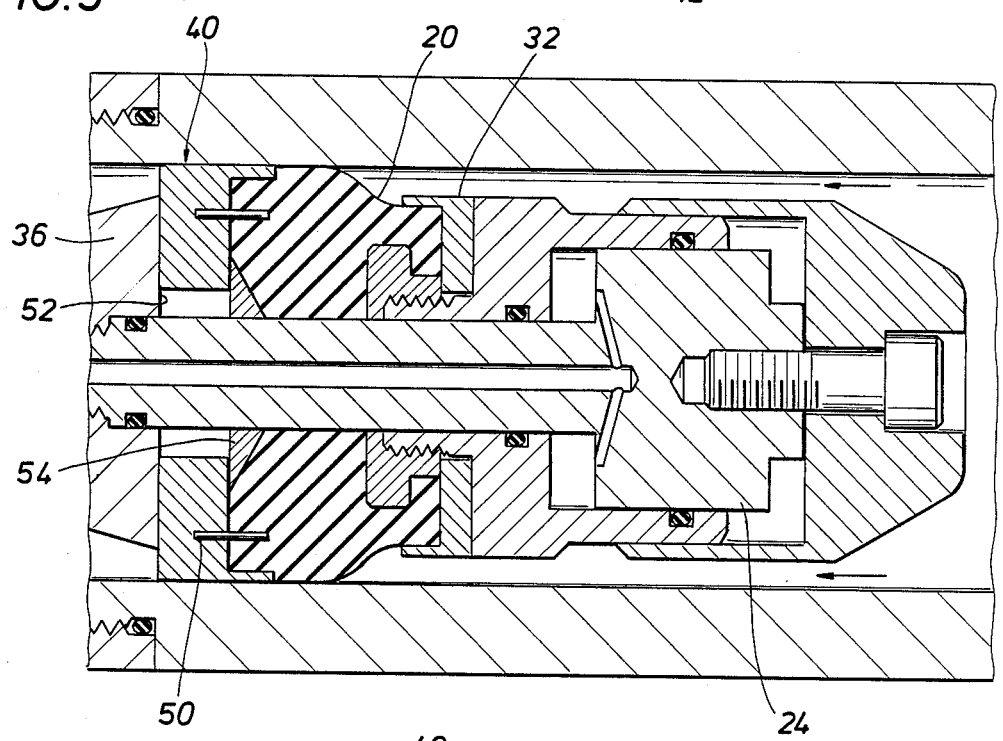

Going over FIG. 3, the fixed end piece 36 serves as a backup plate to the segments 40. The wedges are forced to move, sliding radially outwardly with expansion. This movement is enhanced by providing a surface coating 52 between the members 36 and 40. The coating is preferably placed on the end piece 36, although it can just as easily be placed on the wedges 40. Since there are many wedges, it is probably less costly to coat the single end piece. This coating is only a surface coating and has a thickness which is perhaps 1 mil or less. A typical coating material is a fluorocarbon such as PTFE.

FIG. 3 further shows a circular disc 54 inserted at the end of the resilient plug. The disc 54 is incorporated to serve as a shim beneath the resilient plug and, moreover, it provides a coated metal surface on which the wedges 40 may slide. The pin is located radially outwardly from the disc 54.

Figure 4:
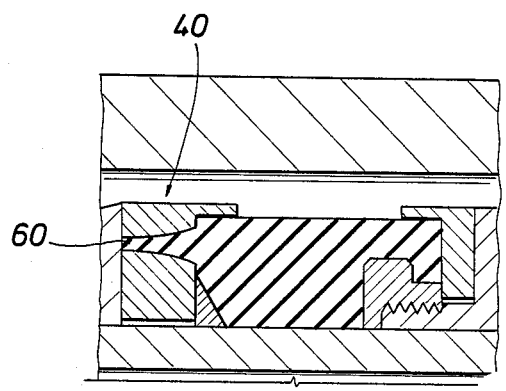

The foregoing describes the preferred mode of attachment of the individual wedge segments. Each wedge has a small hole to receive the fastening pin. The pin is never really under load, and can be quite small. Indeed, an alternative embodiment is shown in FIG. 4 where the resilient body is fabricated with a protruding tip 60 which is fastened in a dimple or drilled hole. The drilled hole is formed in the wedge 40 to receive the protruding tip. Moreover, it is duplicated at the requisite locations so that all the wedges 40 move as one body when radial movement outwardly and thereafter inwardly occurs.

It would appear that the incorporation of the segmented stress ring which is formed of multiple duplicate segments materially extends the life of the resilient plug. It prevents stress concentrations in regions which otherwise tend to destroy the resilient plug. Moreover, when expansion does occur as illustrated in FIG. 3, the plug is guided during expansion so that damage will not occur, and the plug is guided during the relaxation sequence so that the resilient plug is restored to its original shape. This is accomplished with the sequential expansion and then retraction of the various wedges, the collective support furnished by the segments being uninterrupted. The present invention further reduces the energy required to compress the plug because the segmented stress ring is able to slide more readily having contact or indeed a coated metal surface contact between the members 36 and 40. When relaxation occurs, the transition back to the relaxed state is accomplished more readily and easily.

One advantage of the present apparatus is that the plug and stress ring can be installed as a unit in field service operations for replacement of a worn resilient plug. In summary, the proper sequence of operations entails simple installation during field service, substituting the plug and stress ring as a unit in a previously installed flow regulator and thereby reduces service attention required for plug inspection and repair. An alternate form of device is a segmented shingled construction in which abutting segments are constructed with conforming wall contact such as stepped faces. Another alternate form is a surrounding shoulder of thin material, even slightly recessed, which does not create an exposed fluid flow disturbance in the annular space. While the foregoing is directed to the preferred embodiment, the scope thereof is determined by the claims which follow. 9n

What is claimed is:

1. For use in constraining an expandable resilient plug in a flow regulator for controlling fluid flow in an annular flow space surrounding the resilient plug enclosed by a surrounding hollow body, a stress ring which comprises a segmented surrounding peripheral shoulder adapted to fit about and circumferentially support a resilient plug wherein said shoulder is formod of multiple independent segments enabling segments thereof to expand a portion of said resilient plug radially outwardly into the annular space and to separate from adjacent segments wherein said shoulder cooperative with said resilient plug regulates fluid flow through the annular flow space, and further wherein said segments move radially inwardly on contraction of said plug to permit fluid flow in the annular flow space.

2. The apparatus of claim 1 wherein said surrounding shoulder is appended to an end located circular disc adapted to abut the end of the resilient plug, and said disc is formed of multiple wedge shaped segments.

3. The apparatus of claim 2 wherein said segments each supports a surrounding shoulder segment.

4. The apparatus of claim 3 wherein said segments number between about 8 and about 36.

5. The apparatus of claim 3 wherein said segments inscribe equal angles.

6. The apparatus of claim 3 wherein said segments have adjacent abutting edges adapted to confront adjacent segments, and said segments are formed of metal and have collective faces adapted to confront a fixed metal surface in the flow regulator, and including a coating surface on either of said segments or the confronting metal surface.

7. The apparatus of claim 3 wherein each of said segments is pinned by a pin to said resilient plug to move therewith in radial expansion and contraction.

8. The apparatus of claim 3 wherein said segments are connected by connector means to said resilient plug to move therewith in radial expansion and contraction.

9. The apparatus of claim 8 wherein said connector means is a protruding point on resilient plug.

10. The apparatus of claim 1 wherein said stress ring is formed of abutting overhanging tabs collectively comprising said shoulder.

11. The apparatus of claim 10 wherein said tabs are at right angles to said segments.

12. The apparatus of claim 1 wherein said stress ring is formed of abutting tabs of thin gage material.

13. For use in constraining an expandable resilient plug in a flow regulator for controlling fluid flow in an annular flow space surrounding the resilient plug enclosed by a surrounding hollow body, a circular plate which comprises a segmented circular disk having an outer shoulder, said plate adapted to abut and support a portion of a resilient plug wherein said plate is formed of multiple independent segments enabling segments thereof to expand radially outwardly into the annular space and to separate from adjacent segments wherein said shoulder cooperative with said resilient plug regulates fluid flow through the annular flow space, and further wherein said segments move radially inwardly on contraction of said plug to permit fluid flow in the annular flow space.

* * * * *